United States Patent Office 3,529,497
Patented Sept. 22, 1970

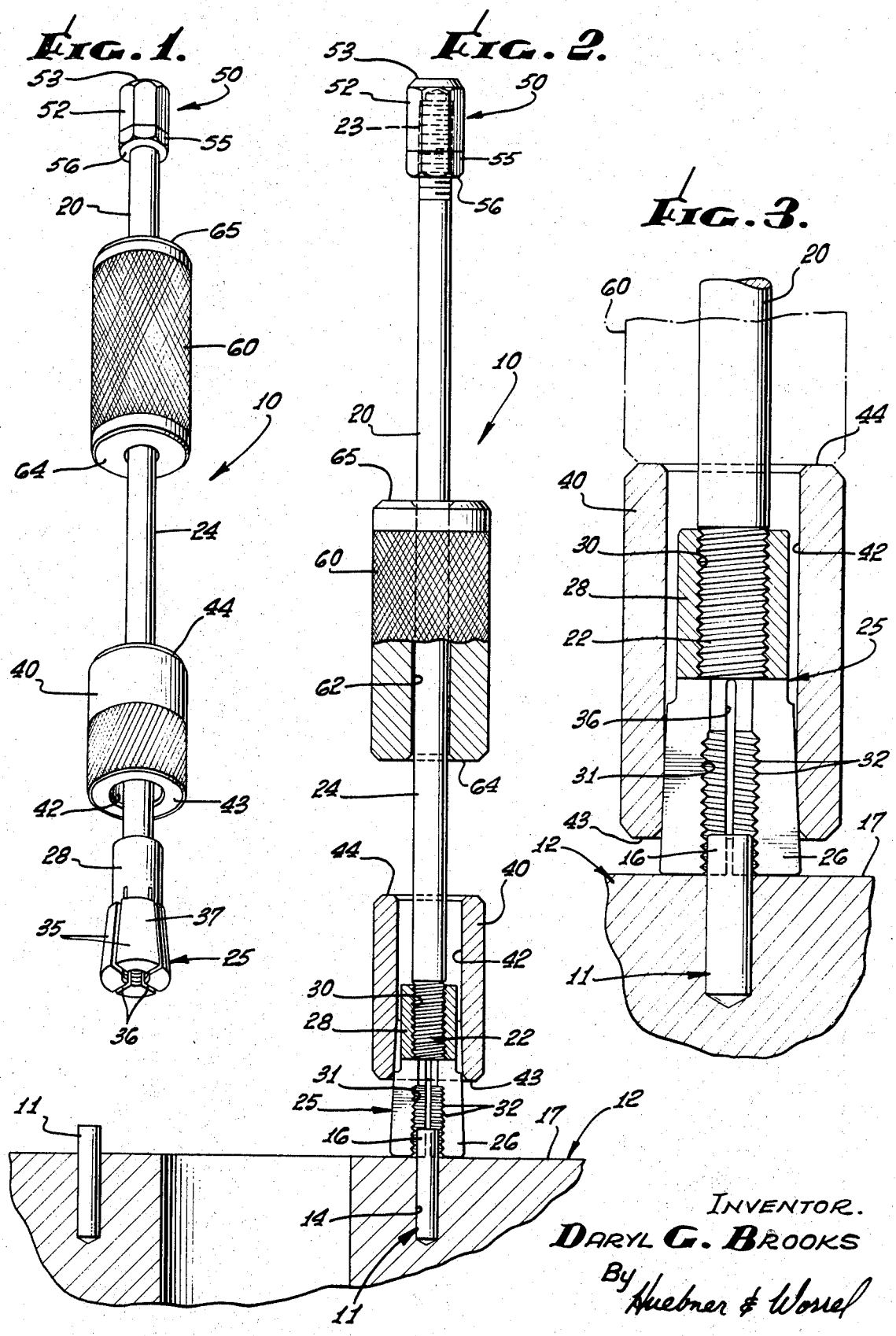

3,529,497
DOWEL REMOVING TOOL
Daryl G. Brooks, 5240 N. Van Ness,
Fresno, Calif. 93721
Filed June 27, 1968, Ser. No. 740,501
Int. Cl. B25b 19/00, 13/50
U.S. Cl. 81—52.35                9 Claims

ABSTRACT OF THE DISCLOSURE

A dowel removing tool providing a dowel gripping member manipulatable between radially contractible dowel gripping and releasing positions which in said latter position is adapted to be freely disposed in circumscribing relation to a dowel prior to its removal from a workpiece including reaction means on the tool in oppositely spaced relation to said gripping member and impact means slidably mounted on the tool between said gripping member and said reaction means for manually actuated reciprocal movement initially against said gripping member to contract the same tightly about such a dowel and subsequently to remove the dowel by engagement of said impact means against said reaction means.

BACKGROUND OF THE INVENTION

Dowels are employed in many structures including engine heads, blocks and the like for precisely positioning component parts of the structure during assembly. Frequently the original dowels become worn, bent or otherwise damaged, requiring removal and replacement during engine rebuilding operations and the like. This is usually an onerous task since only approximately one-quarter of the total length of the dowel is normally exposed above the surface of the supporting workpiece while the greater part of its length is tightly press-fitted into a bore within the workpiece. The problem, of course, has been the difficulty in not being able dependably to grip the exposed portion of the dowel with conventional tools in a manner to maintain the grip on the dowel during the application of a force sufficient to extract the dowel from the bore in the workpiece. Consequently, the usual practice has been to drill and tap the dowel so that an appropriately formed extension device can be screw-threadably installed on the dowel which is more easily grasped by conventional pulling mechanism. Such operation requires a high degree of skill in rigidly clamping the workpiece and precisely aligning the drill which is tedious, time-consuming and relatively expensive in view of the labor involved. Sometimes where the dowel is of a relatively small size, which precludes tapping, the dowel is completely drilled out of the bore in the workpiece which requires even greater precision in locating the drill concentrically of the dowel to preclude damage to the bore. In most instances, such precision drilling is impossible to accomplish which results in a substantial amount of dowel stock remaining which must be chiseled out of the bore with the obvious difficulties attendant thereto. Such drilling operation may also result in the bore being eccentrically enlarged and out of round so as to render it incapable of tightly constraining the replacement dowel in its desired location. When this occurs, an over-sized dowel is usually employed, which requires enlarging the bore in the workpiece and in the mating component part. This further increases the opportunity for error and displacement of the dowel from its desired original location.

SUMMARY OF THE INVENTION

Accordingly, it is an object of the present invention to provide an improved dowel removing tool which is effective quickly, easily and conveniently to extract dowels and the like from workpieces with virtually no damage to the workpieces.

Another object is to provide such an improved dowel removing tool which eliminates the usual drilling procedures of conventional dowel extracting methods.

Another object is to provide an improved dowel removing tool which enables such dowel extraction to be conveniently accomplished in a simple bench operation by not requiring that the workpiece be rigidly clamped in a stationary position.

Another object is to provide a dowel removing tool of the character described which quickly, easily and conveniently accomplishes such dowel extraction in a single operation without requiring any additional tools.

Another object of the present invention is to provide an improved dowel removing tool which is completely hand-operated by a single workman.

Another object is to provide an improved dowel removing tool which has a dowel gripping collet which is conveniently manipulatable between contractible dowel gripping and releasing positions by a contractor sleeve and slide hammer on the tool with the latter utilized to provide a pulling force to extract the dowel from the workpieces with a minimum of exertion by the workman.

Other objects and advantages of the present invention will subsequently become more clearly apparent upon reference to the following description and accompanying drawing.

BRIEF DESCRIPTION OF THE DRAWING

FIG. 1 is a perspective view of a dowel removing tool embodying the principles of the present invention.

FIG. 2 is a somewhat enlarged side elevation and partial section of the dowel removing tool of FIG. 1 disposed in a dowel-receiving position on a fragmentary section of a workpiece containing a plurality of dowels.

FIG. 3 is a further enlarged fragmentary transverse vertical section, taken centrally through the dowel gripping head of the tool disposed in a tightly gripping extracting position with respect to the dowel in the workpiece.

DESCRIPTION OF THE PREFERRED EMBODIMENT

Refering more particularly to the drawing, a dowel removing tool embodying the principles of the present invention is generally indicated by the reference numeral 10. As best shown in FIGS. 2 and 3, the tool is adapted to be utilized for removing a plurality of dowels 11 from a workpiece 12 with the workpiece fragmentarily shown representing an engine block or the like. Each of the dowels is tightly press-fitted into a bore 14 within the workpiece with the dowel having an upwardly exposed end 16 extending above an upper surface 17 of the workpiece a distance usually approximating only one-quarter of its total length.

The dowel removing tool 10 of the present invention provides an elongated substantially rigid support rod 20 of a predetermined diameter having opposite screw-threaded head mounting and impact ends 22 and 23, respectively, and an intermediate guide portion 24. A dowel gripping collet or head 25 is mounted in axially endwardly extended relation from the head mounting end 22 of the support rod. The dowel gripping head includes a workpiece engaging end 26 of a predetermined diameter and an opposite reduced diameter neck portion 28 having an internal screw-threaded bore 30 screw-threadably received upon the head mounting end 22 of the support rod. The workpiece engaging end 26 of the head has an internal screw-threaded bore 31 providing a plurality of axially spaced dowel gripping teeth 32. The gripping head is provided in a plurality of separate interchangeable units which afford a variety of bore sizes for use on a number of different sizes of dowels.

The workpiece engaging end 26 of the dowel gripping head 25 is divided into a plurality of radially contractible segments 35 by a plurality of circumferentially, equally spaced, longitudinally extended slots 36 radiating from the bore 31 outwardly through an outer periphery 37 of the head. The outer periphery of the workpiece engaging end 26 of the gripping head is frusto-conical or tapered from a maximum diametrical dimension at its distal end which tapers toward a minimum diametrical dimension adjacent to the neck portion 28 of the head.

An elongated cylindrical head contractor collar or sleeve 40 is loosely slidably mounted in circumscribing relation about the support rod 20 intermediate its ends. The sleeve includes a bore 42 which is tapered in complementarily intimate fitted relation to the outer tapered periphery 37 of the head. The bore has a maximum diameter adjacent to a leading end 43 of the sleeve and a minimum diameter adjacent to an opposite impact end 44 of the sleeve.

An impact-absorbing stop or reaction assembly 50 is mounted on the impact end 23 of the support rod 20. The assembly provides a hex-shaped internally screw-threaded impact knob 52 having an outer substantially flat solid end surface 53 which is screw-threadably mounted on the impact end of the support rod. A lock nut 55 is screw-threadably mounted on the impact end of the support rod inwardly adjacent to the impact knob for dependably securing the knob and support rod in rigid interconnection. The lock nut provides an inner impact surface 56 disposed in oppositely spaced relation from the impact knob 52.

An elongated cylindrical slide hammer 60 is provided with an elongated axial bore 68 therethrough which is disposed in intimate circumscribing axially sliding relation on the guide portion 24 of the support rod 20 intermediate the contractor sleeve 40 and the lock nut 55. The slide hammer has an end 64 which is selectively engageable with the impact end 44 of the contractor sleeve and an opposite end 65 engageable with the inner impact surface 56 of the lock nut 55.

OPERATION

The operation of the described embodiment of the subject invention is believed to be clearly apparent and is briefly summarized at this point. As previously described, a plurality of the dowel gripping heads 25 are provided in various sizes which may be interchangeably mounted on the head mounting end 22 of the support rod 20. The gripping heads afford progressive bore sizes through a predetermined range with each head having the same size outer periphery 37 to accommodate the tapered bore 42 of the contractor sleeve 40.

Accordingly, an appropriately sized gripping head 25 is selected and installed on the head mounting end 22 of the support rod corresponding to the size of the dowel 11 to be extracted. The leading end 43 of the contractor sleeve 40 is permitted to rest lightly against the outer periphery 37 of the gripping head in non-contracting relation to permit the bore 31 freely to receive the upper exposed end 16 of the dowel, as shown in FIG. 2. With the end of the gripping head 25 rested upon the upper surface 17 of the workpiece, the slide hammer 60 is grasped by the workman for sliding movement along the support rod toward the contractor sleeve 40. The end 64 of the slide hammer is thrust against the impact end 44 of the contractor sleeve in sharply striking relation to force the tapered bore 42 of the contractor sleeve over the outer tapered periphery 37 of the gripping head. Such striking movement of the slide hammer 60 is continued as many times as is necessary radially to contract the head segments 35 to dispose the teeth 32 of the bore 31 in tightly gripping relation to the exposed upper end 16 of the dowel 11.

With the dowel removing tool 10 securely anchored to the dowel 11, the slide hammer 60 is axially slid in the opposite direction along the support rod 20 toward the impact-absorbing assembly 50. Upon such movement, the opposite end 65 of the slide hammer is thrust in sharply striking relation against the inner impact surface 56 of the lock nut 55 to provide a force in a direction to cause the dowel to be drawn outwardly from the bore 14 in the workpiece 12. Reciprocation of the slide hammer is continued until complete withdrawal of the dowel is accomplished which usually only requires two or three blows of the slide hammer against the impact-absorbing assembly.

In order to release the extracted dowel 11 from the bore 31 of the dowel gripping head 25, the outer impact surface 53 of the impact knob 52 on the impact end 23 of the support rod 20 is struck a blow with sufficient force to loosen the contractor sleeve 40 on the gripping head 25. Such releasing operation is usually most conveniently accomplished by merely inverting the tool and tapping the outer impact surface 53 of the impact knob against the upper surface 17 of the workpiece 12. This causes the contractor sleeve axially to slide inwardly of the support rod toward the slide hammer to permit the head segments 35 to return radially outwardly to their dowel releasing positions of FIGS. 1 and 2.

In view of the foregoing, it is readily apparent that the structure of the present invention provides an improved dowel removing tool which is effective quickly, easily and conveniently to extract dowels from workpieces with substantially no damage to the workpiece and without requiring the use of any additional tools. Furthermore, the tool of the present invention is completely hand-operated by a single workman and is effective to remove such dowels with a minimum of physical effort by the workman in a manner not heretofore possible with any of the prior art devices.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A dowel removing tool comprising a dowel gripping member manipulatable between contractible dowel gripping and releasing positions, which in said latter position is adapted to be freely disposed in circumscribing relation to a dowel prior to its removal from a workpiece, reaction means on the tool having an impact surface in spaced relation to said gripping member, and impact means slidably mounted on the tool between said gripping member and said reaction means for manually actuated reciprocal movement initially against said gripping member to contract the same tightly about such a dowel and subsequently to remove the dowel by engagement of said impact means against said impact surface of the reaction means.

2. The dowel removing tool of claim 1 in which said reaction means provides a second reaction surface oppositely spaced from the surface engaged by said impact means against which a force is applied after extraction of the dowel from the workpiece for effecting expansion of said gripping member to its dowel releasing position.

3. A dowel removing tool comprising an elongated support having opposite ends, contractible dowel gripping means mounted on one end of the support, impact absorbing means on the end of the support opposite from said end mounting said gripping means, and impact means slidably mounted on said support intermediate its ends for manual reciprocation thereon alternately to engage said gripping means for contracting the same around dowels and the like and to engage said impact absorbing means to provide a dowel pulling force substantially axially of the support from the gripping means toward said impact absorbing means.

4. The dowel removing tool of claim 3 in which said gripping means includes an elongated longitudinally slotted head providing a plurality of contractible segments circumscribing a dowel gripping bore, and a head contractor member on the support positionable in circumscribing relation to the head for engagement by said impact means to contract said segments radially inwardly of the bore.

5. The dowel removing tool of claim 4 in which said contractor member comprises an elongated sleeve having a tapered bore, and said head having an outer periphery complementarily tapered with respect to said bore of the sleeve.

6. The dowel removing tool of claim 5 in which said head is internally screw-threaded within the bore to provide a dependable gripping surface for such dowels and the like.

7. The dowel removing tool of claim 6 in which said support comprises an elongated rod having an end mounting said dowel gripping head with said contractor sleeve disposed loosely thereabout, an opposite end mounting said impact absorbing means and an intermediate portion axially slidably mounting said impact means for manually actuated reciprocal movement between said ends of the rod initially against said sleeve and subsequently against said impact absorbing means.

8. A dowel removing tool, for extracting dowels and the like which are disposed in tightly press-fitted relation to a bore within a workpiece such as an engine head, block or the like, comprising an elongated support rod having opposite head mounting and impact absorbing ends, and a guide portion intermediate its ends; an elongated dowel gripping head having an outer workpiece engaging end and an opposite mounting end connected to said mounting end of the support rod including a plurality of radially contractible segments defined by a corresponding number of circumferentially spaced longitudinally extended radial slots with the segments circumscribing an axial screw-threaded bore and with the head having an outer periphery tapering from a maximum diameter at said workpiece engaging end thereof to a minimum diameter adjacent to its mounting end; an impact absorbing stop member mounted on said impact absorbing end of the support rod; a head contractor sleeve disposed in loosely circumscribing axially slidable relation on said support rod having a bore complementarily tapered with respect to the tapered outer periphery of the head for intimate contracting engagement therewith incident to relative axial movement of the sleeve telescopically over the head; and an elongated manipulatable slide hammer mounted for reciprocal movement on said intermediate guide portion of the support rod initially manipulatable in striking engagement with said sleeve tightly to contract the head about such a dowel and subsequently to remove the dowel from the workpiece by striking engagement of said slide hammer against said impact absorbing stop member.

9. The dowel removing tool of claim 8 in which said impact absorbing stop member provides opposite predetermined inner and outer faces with the latter affording an impact surface against which a force may be applied for loosening said contractor sleeve on the head to permit expansion of said head segments for convenient removal of the extracted dowel from the tool.

References Cited
UNITED STATES PATENTS

| | | | |
|---|---|---|---|
| 3,222,915 | 12/1965 | Swisher | 29—254 X |
| 3,136,040 | 6/1964 | Bauer et al. | 173—91 X |
| 2,497,214 | 2/1950 | Dreyer | 81—43.2 |
| 1,815,500 | 7/1931 | Doan | 81—53.2 |

JAMES L. JONES, Jr., Primary Examiner

U.S. Cl. X.R.

29—254; 81—53.2; 173—91